United States Patent [19]

Harter

[11] Patent Number: 5,582,088

[45] Date of Patent: Dec. 10, 1996

[54] ANGULARLY ADJUSTABLE PANEL CUTTING DEVICE

[76] Inventor: Edward R. Harter, 298 Lux Ave., Cincinnati, Ohio 45216

[21] Appl. No.: 257,928

[22] Filed: Jun. 10, 1994

[51] Int. Cl.⁶ .................................................. B27B 5/07
[52] U.S. Cl. .................... 83/468.4; 83/471.3; 83/486.1; 83/581
[58] Field of Search ........................... 83/471.3, 614, 83/486.1, 468.3, 468.4, 471.3, 581

[56] References Cited

U.S. PATENT DOCUMENTS

| 2,633,162 | 3/1953 | Neuenschwander. | |
|---|---|---|---|
| 2,739,624 | 3/1956 | Haddock. | |
| 2,770,265 | 11/1956 | Pollock | 83/468.3 |
| 2,818,892 | 1/1958 | Price. | |
| 2,973,020 | 2/1961 | Bennett | 83/471.3 |
| 3,008,498 | 11/1961 | Olson. | |
| 3,866,496 | 2/1975 | Payne | 83/471.3 |
| 3,901,498 | 8/1975 | Novak | 83/468.3 |
| 4,181,057 | 1/1980 | Bassett | 83/471.3 |
| 4,919,384 | 4/1990 | Grimberg | 83/745 |
| 5,062,339 | 11/1991 | Campos | 83/471.3 |
| 5,473,968 | 12/1995 | Break et al. | 83/471.3 |

Primary Examiner—Kenneth E. Peterson
Assistant Examiner—Sean A. Pryor
Attorney, Agent, or Firm—Wood, Herron & Evans, P.L.L.

[57] ABSTRACT

An adjustable panel cutter including a table for supporting the workpiece horizontally, semi-vertically or vertically, a guide frame mounted for pivotal movement at a lower end thereof with respect to the table and a cutting tool carriage slidably received on the guide frame. A power cutting tool is mounted in the cutting tool carriage. The guide frame is moveable angularly across the plane of the table following an arcuate slot in the table in which a guide and locking pin, attached at an upper end of the guide frame, is attached. A quick locking and release mechanism is operatively connected to the guide and locking pin to allow an operator to easily set the guide frame and cutting tool at a desired angle.

16 Claims, 4 Drawing Sheets

5,582,088

ANGULARLY ADJUSTABLE PANEL CUTTING DEVICE

BACKGROUND OF THE INVENTION

This invention generally relates to the field of woodworking and the like in which large panels or sheetgoods are cut at specific angles. Specifically, the invention relates to a sheetgood cutting table that allows such large panels, on the order of 4'×8', to be cut quickly and accurately at preset angles.

In home and small workshops there is often a need to make cuts in sheetgoods ranging, for example, from vertical to 45°. Some sophisticated, expensive tools, such as sliding tables and laser cutters, will tend to serve the needs of large manufacturers well, but because of the size and expense of such machines, they are impractical for home use or smaller shops.

In smaller shops, the handling of the sheetgood is a prime concern. Such sheet goods are usually at least 4'×8' and may vary in thickness from ⅛" to 1¼". Because of their size, weight, and flexibility, these panels and sheetgoods are very difficult to handle, especially for one person. If the sheetgood is not precisely handled and guided during the cutting operation, the sheetgood will bind in the cutting tool and become damaged. Easy and precise handling is therefore critical to the accuracy of any cut.

The positioning of the sheetgood is another important concern for smaller shops. Horizontal positioning of the sheetgood may be appropriate if more than one operator is available or if time is taken to firmly secure the sheetgood with clamps, etc., before attempting a cut. Vertical and semi-vertical positioning of the sheetgood significantly eases the cutting procedure for the solo operator. Vertical and semi-vertical positioning of the sheetgood also reduce space and storage area requirements. The manner in which the sheetgood is cut, whether the sheetgood moves across the cutting tool or whether the cutting tool moves across the sheetgood, is also critical to the ease of handling and accuracy of the cut. Finally, the size and positioning of an angle measuring device, such as a protractor, are key considerations to the setup and accuracy of the angle cut.

Until now, there has been no commercially available, affordable tool for the home or small workshop that can easily handle and accurately cut angles on all types of sheetgoods, especially relatively large panels. Many panel saws that accommodate sheetgoods are commercially available, but they do not cut angles in the range of 0°–45°. Instead, these prior devices only cut horizontally or vertically, i.e, they only ripcut and crosscut. Many miter saws are commercially available, but these only handle relatively small workpieces, usually up to about one foot in size. Furthermore, most available tools are for saws only, and will not accommodate other cutting tools, such as routers.

One prior sheetboard cutting machine is disclosed in U.S Pat. No. 3,008,498 to Olsen. This device is said to cut sheetgoods at angles. An important drawback to this design, however, is that the cutting blade is expected to move the sheetgood on rollers while cutting the angle. Because many wood sheetgood products may weigh as much as one hundred pounds, the saw blade will flex under the force of moving the sheetgood, and the sheetgood will tend to bind during travel. These problems would only be worse on even heavier materials such as plastics. Poor movement of the sheetgood therefore makes this tool awkward and difficult to use and control, and greatly decreases the accuracy of the angle cuts.

Another saw table, disclosed in U.S Pat. No. 2,739,624 to Haddock also cuts sheetgoods at angles, but only if the sheetgood lays horizontally on the tool. This horizontal positioning decreases control and accuracy because the operator must reach across the sheetgood while operating the cutting tool. If a 4'×8" sheetgood is attempted to be cut, the operator's reach must be nearly six feet. This makes the operation likely to require more than one operator, reducing the useability of the tool. Furthermore, this design places a small protractor at the tool fence, at the inside edge of the sheetgood. A small error in setting is therefore magnified as the cutting tool reaches the outer edge of the sheetgood. This design feature greatly reduces the accuracy of the angle cut.

U.S. Pat. No. 2,818,892 to Price also discloses a relatively small fixture for making angled cuts but this fixture includes other design difficulties. Because of the placement of the protractor/angle measuring device, the workpiece could very well extend beyond the protractor, making it impossible to see and accurately align the cutting tool. Furthermore, this design has a double frame and has many parts that could wear quickly, increasing required maintenance and reducing useability and accuracy. Although Price shows a vertically oriented cutting frame for cutting large sheet panels, there is apparently no means for making angled cuts other than horizontal and vertical cuts with this device. The fixture which Price does disclose for making angled cuts accommodates workpieces up to about one foot in size.

The portable miter box shown in U.S. Pat. No. 2,633,162 to Neuenschwander pivots the cutting tool approximately in the center of the frame, which works adequately with relatively small workpieces, but is not a suitable design for cutting materials such as relatively large sheetgoods.

SUMMARY OF THE INVENTION

In view of the drawbacks in this area of the art of panel cutting, it has been one object of the invention to provide a sheetgood or panel cutter for cutting in horizontal, semi-vertical, or vertical modes to meet the handling and storage needs of all workshops.

It has been another object of the invention to enable precise angles to be easily cut, even in sheetgoods of relatively large sizes. It has been still another object of the invention to enable the operator to use multiple cutting tools, such as saws and routers with a single angularly adjustable guide frame.

It has been still a further object of the invention to reduce the complexity and number of parts in such a sheetgood angle cutter, thereby reducing manufacturing effort and cost and increasing and enhancing reliability and maintainability.

It has been a still further object of the invention to provide rigidity and support for the cutting tool and cutting tool carriage by way of a unique support frame and pivotal guide frame especially suited for accommodating large sheetgoods.

To these ends, the preferred embodiment of the present invention includes an angularly adjustable panel cutting device comprising a support frame having a support surface for holding a sheetgood panel of at least approximately 4'×8' in size and an inset panel having an arcuate guide surface and angle indicating indicia on an upper surface thereof generally following the guide surface. A guide frame is attached to the support frame with a first end of the guide frame being pivotally secured to the support frame and the second end including a slide block having a guide member in engagement with the arcuate guide surface of said inset panel and guiding movement of the second end of the guide frame along an arcuate path which defines a variable cutting angle. A cutting tool carriage is mounted for linear movement along the guide frame between the first and second ends thereof to make the cut. Also, a lock is included at the second end of the guide frame and acts between the second end and the support frame to lock the guide frame at a desired cutting angle.

More specifically, the support frame is preferably a generally upright structure for holding the sheetgood or panel at a generally upright angle during a cutting operation. Alternatively, the support frame may be disposed horizontally, such as on a table, or vertically, such as by being supported or hung on a wall. The guide frame comprises a pair of guide rails mounted at the first end to a pivot end block that is pivotally connected to the support frame and at the second end to a slide block. The pivot end block includes a pivot lock mechanism for selectively restraining pivotal movement thereof. The slide block includes an angled edge for providing support to a sheetgood during an angled cutting operation. The guide member comprises a locking pin extending from the sliding end block and disposed within an arcuate guide slot defining the arcuate guide surface and contained in a support frame panel which is inset or recessed from the sheetgood or panel support surface.

Angle measurement indicia or graduations are contained on the inset or recessed support panel and face in a direction generally the same as the support surface for easy viewing by the operator. These indicia or graduations are disposed proximate the second end of the guide frame and generally follow the arcuate slot such that they may be read by the operator with, for example, a 4'×8' sheetgood or panel in place on the support surface.

The lock mechanism on the sliding end block comprises a quick lock and release mechanism constructed according to another aspect of the invention. Specifically, a cam member is connected to a locking arm or rod and includes a cam surface engaging a portion of the guide frame which, more particularly, is an upper surface of the sliding end block. The cam member is further connected to a sliding lock pin which registers in the arcuate guide slot of the recessed or inset support panel. Rotation of the cam member by way of the locking arm or rod unlocks the sliding lock pin with respect to the arcuate guide slot and support panel and rotation of the cam member in an opposite direction by way of opposite rotation of the locking arm or rod locks the sliding lock pin with respect to the arcuate guide slot and inset support frame panel.

According to another aspect of the invention, a counterbalancing device is connected between the second end of the guide frame and the support frame for counterbalancing the weight of the guide frame during angular adjustment thereof.

Another way of characterizing the uniqueness of the invention, and an aspect of its design that makes it highly useful for one operator to easily cut large panels or sheetgoods at angles ranging from 0°–45°, is by defining the support frame generally in four quadrants. In this regard, the pivoting end of the guide frame is secured to the support frame in a lower quadrant thereof and the guide member secured to the second end of the guide frame allows movement of the second end along an arcuate path contained generally within the two upper quadrants of the support frame. Limits of movement of the guide frame are defined between a vertical orientation thereof with the second end being disposed in a first upper quadrant and approximately a 45° orientation with the second end being disposed in a second upper quadrant. Especially when the support frame is in a generally upright position, this construction and arrangement of the support frame and pivotal guide frame allows very quick and easy set-up and cutting of large panels by a single operator.

Further objects and advantages of the invention will become more apparent upon review of the following detailed description of thereof taken in conjunction with the accompanying drawings.

DETAILED DESCRIPTION OF THE PREFERRED EMBODIMENT

Figure 1:
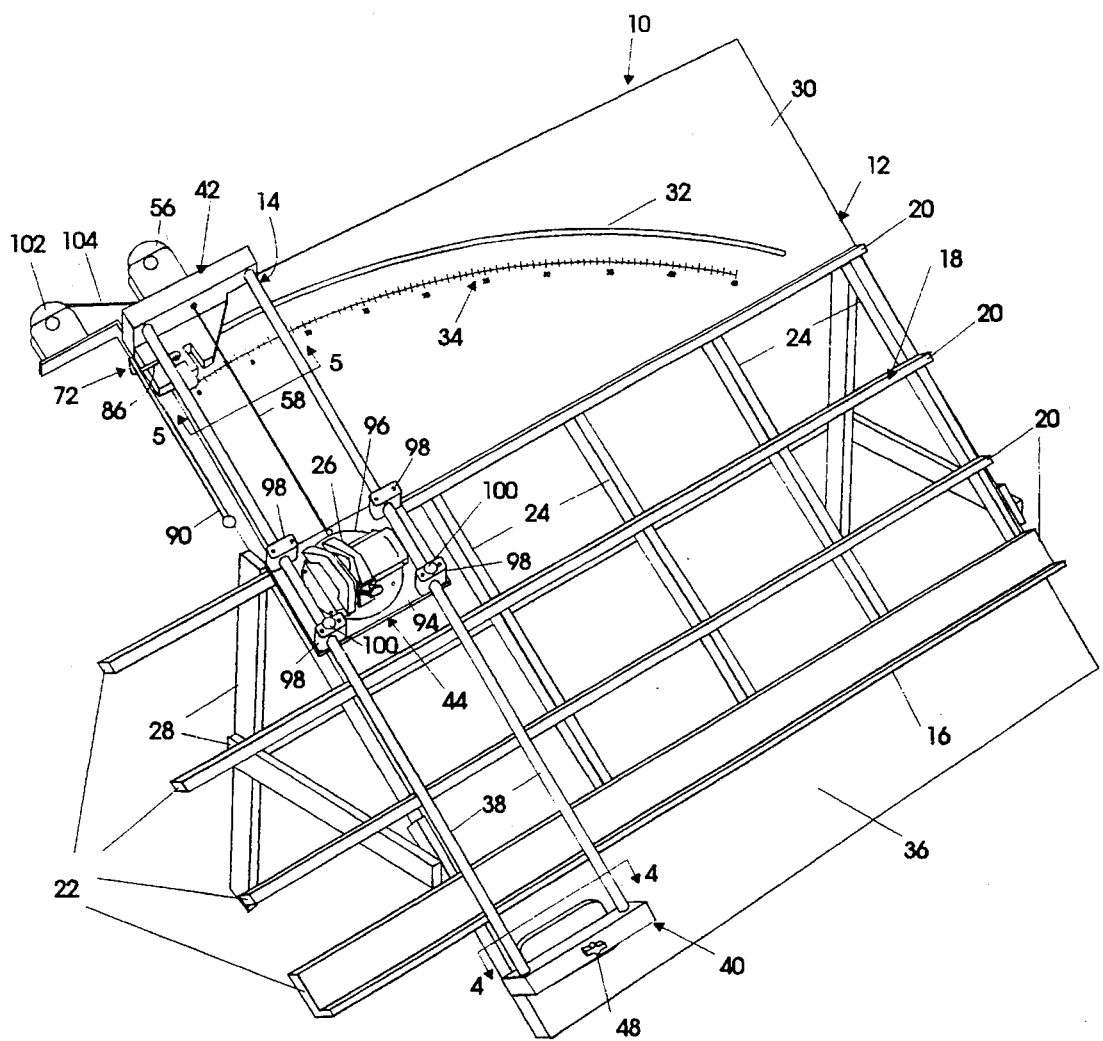
FIG. 1 is a front perspective view of an angularly adjustable panel cutting apparatus constructed according to a preferred embodiment of the invention.

A preferred embodiment of the angularly adjustable panel cutting device 10 is shown in FIG. 1. Cutting device 10 is generally comprised of a support frame 12 and an angularly adjustable guide frame 14. Sheetgood panels are placed edgewise on a horizontally extending fence 16 while leaning flatly against a support surface 18 of support frame 12. Support surface 18 provides support to a sheetgood panel during a cutting operation and is comprised of the combined upper surfaces 20 with a plurality of horizontally spaced panel support members 22 secured to perpendicular frame members or bars 24 with fasteners such as bolts (not shown). Panel support members 22 are constructed of or have a front facing surface of an erodible material such as wood, particle board, or medium density fiber board (MDF) to avoid damage to a power cutting tool 26 carried by guide frame 14. Frame bars 24 may be constructed of various materials (e.g., wood, steel or aluminum), depending on durability and cost requirements. Panel support members 22 are secured forward of frame bars 24, together presenting a forward facing planar support surface 18.

Cutting device 10 is supported in a preferred inclined orientation by rear supports 28. Rear supports 28 more specifically comprise rear slats attached to frame bars 24 with fasteners such as bolts (not shown). However, rear supports 28 may be easily removed by removing such fasteners in order to position device 10 horizontally or vertically, depending on the user's needs. Furthermore, by the simple addition of latching mechanisms (not shown) rear supports 28 may be also folded inwardly to be in a plane generally parallel with support surface 18 instead of removing them completely.

Figure 2:
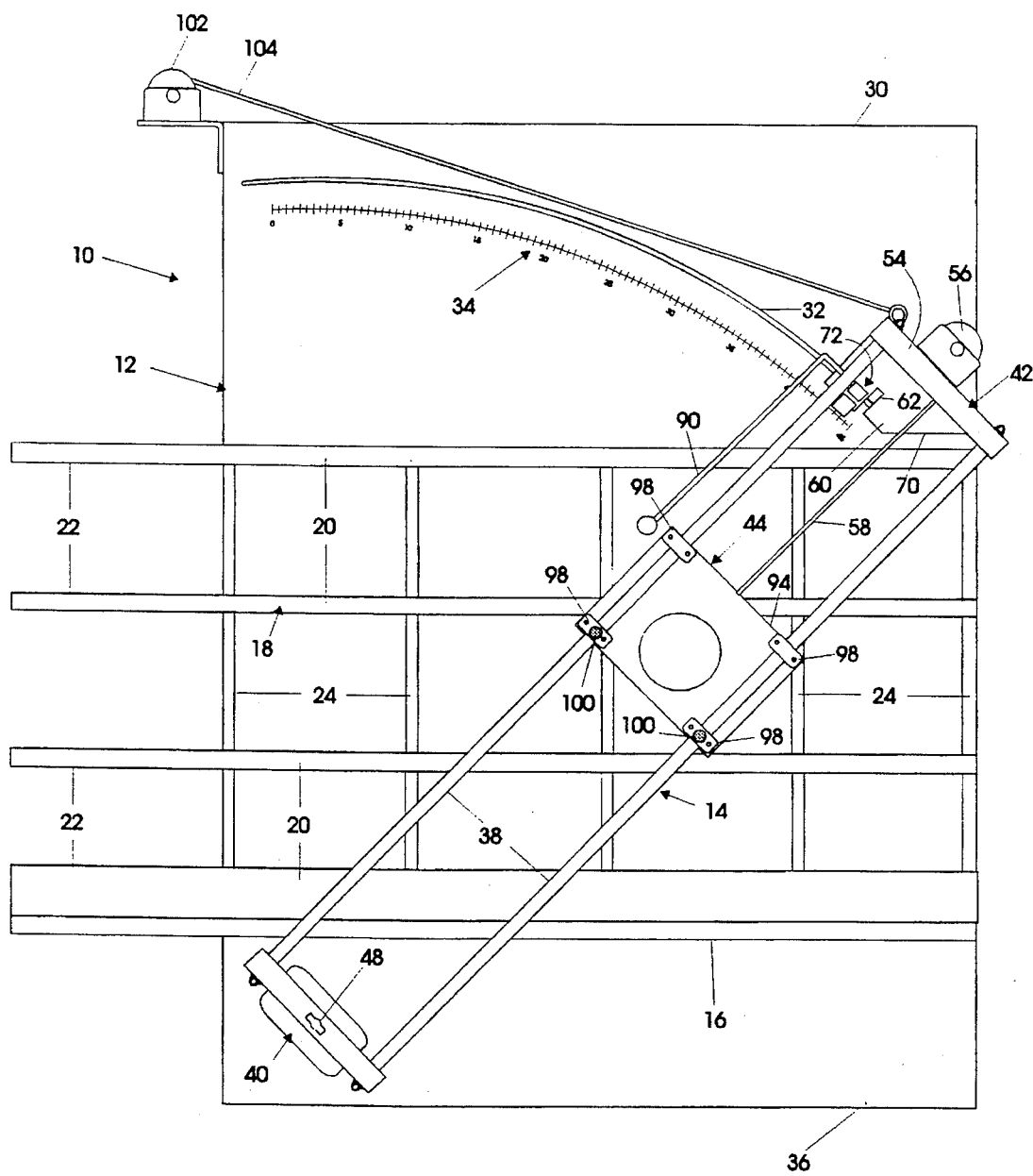
FIG. 2 is a front elevational view of the panel cutting apparatus shown in FIG. 1 but with the saw guide frame oriented at about a 45° cutting position.

As further shown in FIGS. 1 and 2, at the top of support frame 12 a slide support panel 30 constructed of laminate, MDF or similar durable material is rigidly affixed to frame bars 24. An arcuate guide slot 32 is contained in panel 30 and panel 30 further includes angle indicating indicia for graduations 34 which are located below guide slot 32 and generally follow the curvature thereof. As further detailed below, arcuate guide slot 32 is part of a guide means which guides and stabilizes the top of guide frame 14 during angular adjustment thereof. Slide support panel 30 as well as slot 32 and angle measuring indicia 34 are inset below support surface 18 and, more specifically, below support members 22 as well as below the cutting depth of tool 26 to allow cutting tool 26 to pass over panel 30 and thereby preventing damage to panel 30. Angle measuring indicia 34 in the preferred embodiment are printed on mylar or similar material which is adjustable and replaceable. However, angle measuring indicia 34 may also be engraved in metal or constructed by various other suitable means. Angle measuring indicia 34 are located at nearly the top of slide support panel 30 at a position that minimizes the total size of device 10 while maximizing visibility of indicia 34 and maximizing the accuracy of the angle cut. At the bottom of cutting device 10 is a bottom support panel 36 which may or may not be the same panel as slide support panel 30.

Figure 4:
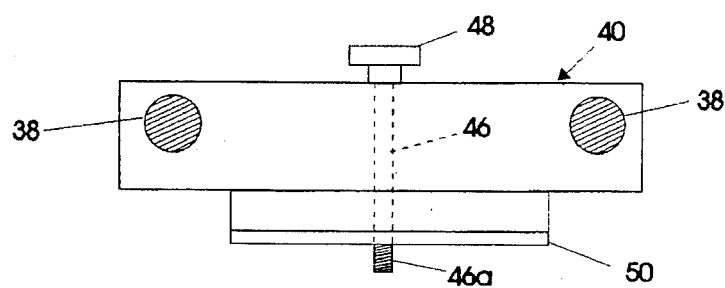
FIG. 4 is a cross sectional view of the apparatus taken along line 4—4 of FIG. 1 and showing the pivot block of the guide frame.

Guide frame 14 comprises a pair of parallel guide rods or rails 38, a pivot end block 40, a slide block 42, and a sliding cutting tool carriage 44. Guide rods or rails 38 are rigidly attached to pivot end block 40 and slide block 42. As best illustrated in FIG. 4, a stud 46 serves as a pivot for pivot end block 40 and includes a threaded end 46a that threads into bottom support panel 36. A tightening handle 48 on the opposite end of stud 46 may be turned to lock and release pivot end block 40. Block 40 is mounted on a high molecular weight polyethylene base 50 or on a base of similar material to reduce wear during angular movement of guide frame 14.

Figure 5:
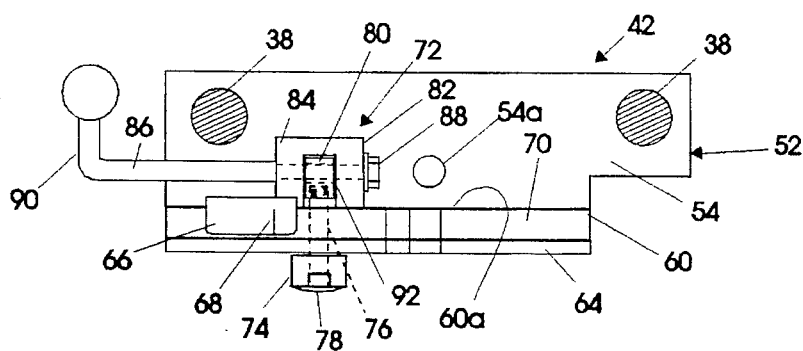
FIG. 5 is a cross sectional view of the apparatus taken along line 5—5 of FIG. 1 and showing the slide block of the guide frame.
Figure 6:
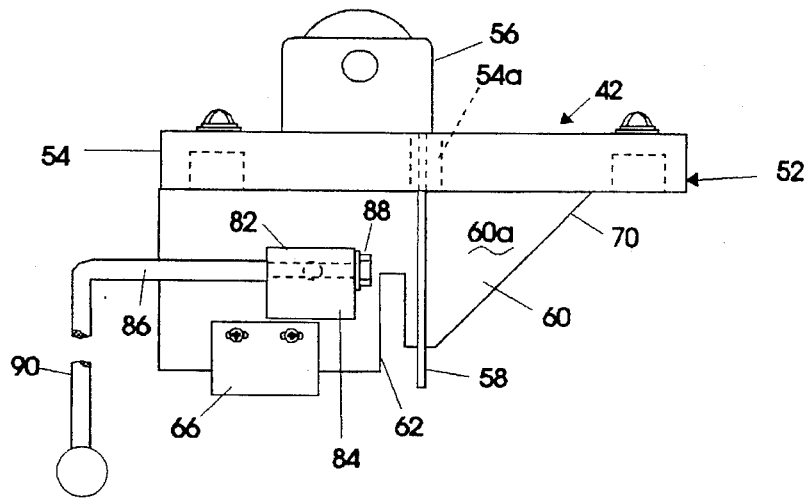
FIG. 6 is a top view of the slide block.

Referring now to FIGS. 5 and 6, slide block 42 generally comprises a guide member and support for guiding and supporting movement of guide frame 14. Specifically, slide block 42 comprises an L-shaped support 52 with guide rods or rails 38 being rigidly fixed to a vertical member 54 thereof. A spring biased counterbalancing mechanism or retractor 56 is also mounted to vertical member 54 and includes a flexible line or cable 58 attached to tool carriage 44. Cable 58 of retractor 56 fits through a hole 54a drilled in vertical member 54. Retractor 56 is a safety device that returns tool carriage 44 to its upper storage position. A horizontal member 60 of L-shaped support 52 includes a slot 62 for receiving a saw blade 26a (FIG. 3) of tool 26 at the upper end of its travel. Of course, tool 26 may comprise other types of power tools, such as a router and slot 62 may alternatively be adapted to receive the cutting piece of such an alternative tool as well. In the manufacture of the device 10, a cutting tool such as a router may be positioned or extended through slot 62 in order to route arcuate slot 32. Horizontal member 60 is mounted on a base 64 of high molecular weight plastic or similar low friction material. A pointer 66 is mounted on horizontal member 60 and positioned so that when a marking line 68 thereon aligns with an angle graduation of indicia 34, the blade 26a of cutting tool 26 will cut the angle of that graduation. Horizontal member 60 further includes an inside edge 70 which is disposed at 45° with respect to vertical member 54 as shown in FIG. 6. When guide frame 14 is at the 45° cutting position as shown in FIG. 2, edge 70 is generally parallel to the top edge of the sheetgood or panel being cut and generally parallel to fence 16. Preferably, when a standard sized large panel such as a 4'×8' panel is being cut, edge 70 rests against the top edge of the panel to provide further stabilization and support during the cutting operation. The L-shape of slide block 42 provides significant strength and support for cutting tool carriage 44.

Figure 3:
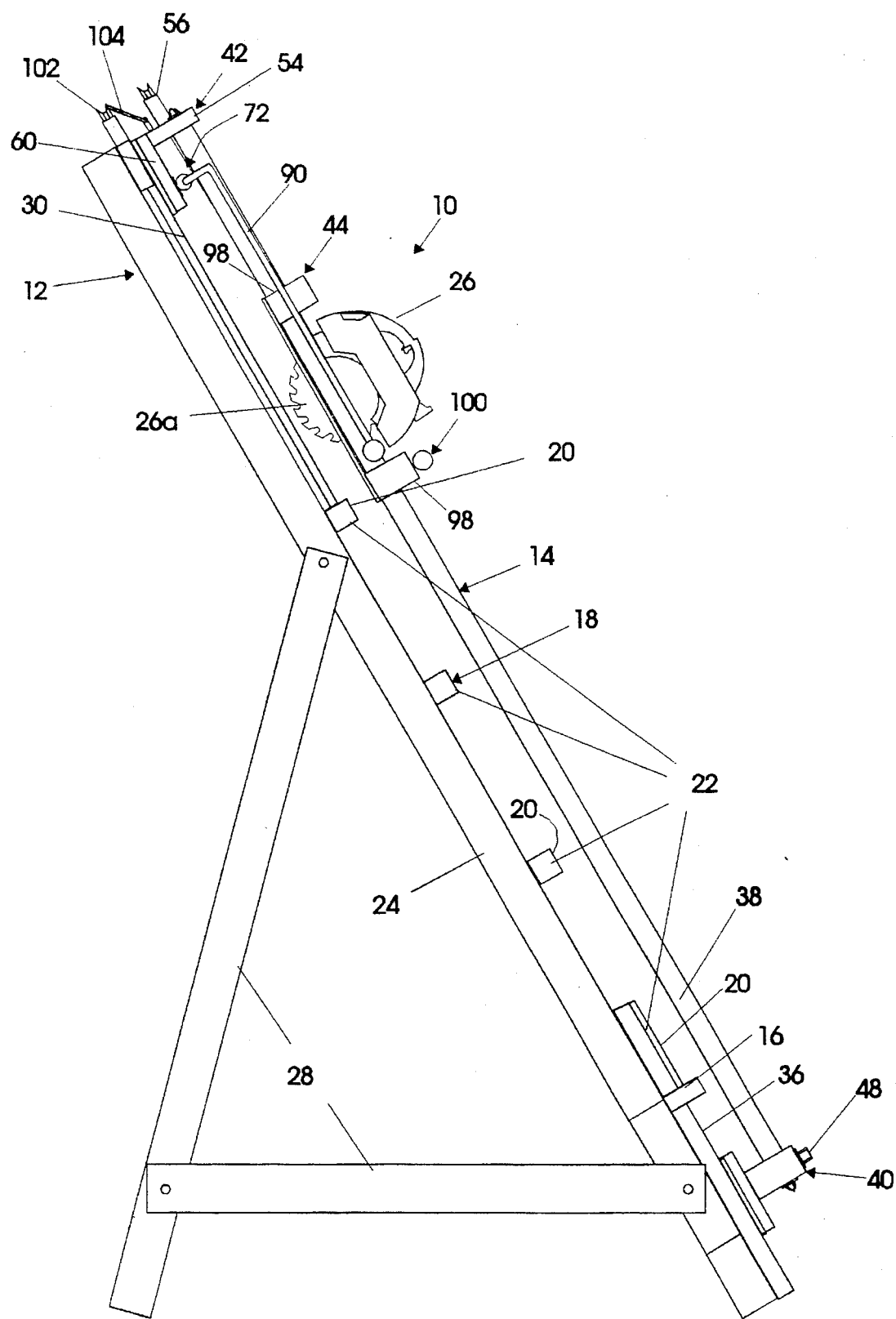
FIG. 3 is a side elevational view of the apparatus set up as shown in FIG. 1.
Figure 7:
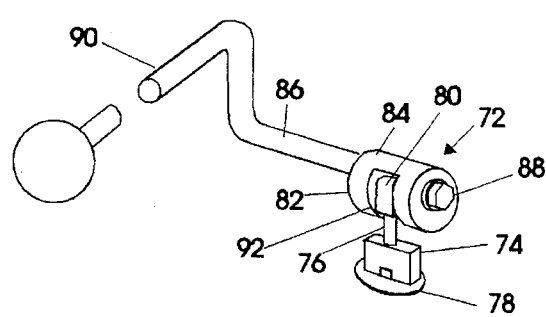
FIG. 7 is a perspective view of the quick locking and release mechanism for the slide block of the apparatus.

Referring now to FIGS. 5–7, horizontal member 60 further includes a guide member 72 for guiding slide block 42 along an arcuate path defined by arcuate guide slot 32. Specifically, guide member 72 comprises a sliding lock pin or slot follower 74 which is inserted into guide slot 32 to guide the movement of slide block 42 during angular adjustment of guide frame 14. As shown in FIGS. 5 and 7, sliding lock pin or slot follower 74 is attached to a bolt 76 having a head 78 adjacent sliding lock pin or slot follower 74 and a flat portion 80 at an opposite end. Guide member 72 further comprises a cam member 82 having a cylindrical outer surface 84 and being rigidly affixed to a rod 86 by way of, for example, a bolt 88. Rod 86 is further connected to a handle 90 which extends downwardly alongside one of the guide rods 38, perpendicular to rod 86, as shown in FIGS. 1–3. Cam member 82 further includes a slot 92 which receives the flat portion 80 of bolt 76. Flat portion 80 further rotatably receives rod 86 therethrough such that cam member 82 may rotate about flat portion 80 when rod 86 is rotated about its axis. Rod 86 extends through the cylindrically shaped cam member 82 along an axis which is offset from the central axis of the cylindrical cam member 82 and at the outer cam surface 84 of member 82 is in contact with an upper surface 60a of horizontal members 60 such that when handle 90 is moved downwardly and upwardly, respectively, bolt 76 is also moved upwardly and downwardly to lock slide block 42 in place. In this regard, when handle 90 is moved downwardly, for example, to lock slide block 42 in place, bolt 76 is lifted and therefore sliding lock pin or slot follower 74 and bolt head 78 are also lifted with head 78 engaging against an underside of panel 30 on opposite sides of the arcuate guide slot 32 and cam surface 84 bearing against upper surface 60a to effectively clamp slide block 42 in place. In a reverse manner, when handle 90 is lifted, cam member 82 is rotated and sliding lock pin or slot follower 74, bolt 76 and head 78 are together lowered to unclamp guide member 72 from panel 30 to thereby allow sliding action of slide block 42 along the upper surface of panel 30 and following the path of arcuate guide slot 32. Referring back to FIGS. 1–2, cutting tool carriage 44 is generally comprised of a cutting tool mounting plate 94 which is adapted to receive a cutting tool 26 connected to an adjustable mounting plate 96. As shown, cutting tool 26 comprises a circular power saw. Alternatively, cutting tool 26 may be a router with a suitable plate connected thereto for mounting to cutting tool mounting plate 94. Adjustable mounting plate 96 may be rotated and locked at either the vertical position shown in FIG. 1 or an alternative horizontal position (not shown). Slide bushings 98 are affixed at the four corners of cutting tool mounting plate 94. A guide rod 38 is received in each of two slide bushings 98 such that tool carriage 44 may slide along guide rods 38. Two of the slide bushings 98 include lock devices 100 which simply comprise threaded finger clamps which may be turned to lock tool carriage 44 at a particular position along guide rods or rails 38. This is useful when device 10 is used in a ripcut mode in which saw blade 26a is oriented parallel to fence 16 and tool carriage 44 is fixed while a panel is moved across the blade for cutting lengthwise therealong.

The use and operation of device 10 will be readily understood from the following description. A sheetgood panel such as a 4'×8' plywood sheet, is placed with the longer edge resting against fence 16 and with one face thereof resting against support surface 18. The operator then grasps guide frame 14 and lifts handle 90 to unlock slide block 42. With pivot block 40 also unlocked, guide frame 14 is pivoted to the desired angled position. Guide frame 14 is then locked into place by pushing handle 90 downwardly to a position generally parallel with guide members 38. With the panel appropriately positioned with respect to the angled guide frame 14, tool 26 is grasped and moved downwardly with tool carriage 44 to make the desired cut. When the tool 26 is released, it automatically and gently returns to its upper storage position by way of retractor 56. A further spring loaded retractor 102, essentially identical to retractor 56, is mounted to support frame 12 and includes a flexible line or cable 104 attached to guide frame 14 such that, when unlocked, guide frame 14 will be returned to its upright position as shown in FIG. 1.

While the preferred embodiment of the present invention has been described in detail above, those of ordinary skill in the art will readily recognize many alterations and substitutions of the various components thereof. For example, the angle measuring indicia may be made in various increments and over various angular ranges depending on the needs of the user. Also, although the size of the frame in this preferred embodiment has been chosen to accommodate standard 4'×8' panels, the size of the frame can be altered to accommodate even larger sheetgoods than the standard size. Many other modifications will be recognized by those of ordinary skill and, thus, the scope of this invention is intended to be determined by the appended claims rather than by the specific descriptions given herein.

I claim:

1. An angularly adjustable panel cutting device comprising:

a support frame having a lower horizontally extending fence and a support surface for holding a sheetgood panel of at least approximately 4'×8' in size and an inset panel having an arcuate guide surface and angle indicating indicia on an upper surface thereof generally following said guide surface;

a guide frame having a first end and a second end, said first end being pivotally secured to said support frame and said second end including a slide block secured to said guide frame, said slide block having a guide member in engagement with said arcuate guide surface of said inset panel and guiding movement of said second end along an arcuate path to define a cutting angle;

a cutting tool carriage mounted for linear movement along said guide frame between said first and second ends;

a lock connected at said second end of said guide frame and acting between said second end and said support frame to lock said guide frame at a desired angle; and, wherein said slide block includes an edge extending generally parallel to said fence when said guide frame is pivoted to a position extending about 45° with respect to said fence, said edge thereby adapted to abut an upper edge of the sheetgood panel.

2. The cutting device of claim 1 wherein said support frame is a generally upright frame for holding said panel generally upright during a cutting operation.

3. The cutting device of claim 1 wherein said support frame is angularly adjustable so as to enable said support surface to be oriented substantially vertically or horizontally or at a position between vertical and horizontal.

4. The cutting device of claim 1 wherein said guide frame comprises a pair of guide rails mounted at said first end to a pivot end block that is pivotally connected to said support frame and mounted at said second end to said slide block.

5. The cutting device of claim 4 wherein said pivot end block includes a pivot lock mechanism for selectively restraining pivotal movement thereof.

6. The cutting device of claim 4 wherein said guide member comprises a locking pin extending from said slide block and disposed within an arcuate slot defining said arcuate guide surface.

7. The cutting device of claim 6 wherein said angle indicating indicia on said inset panel faces in a direction generally the same as said support surface, said indicia being disposed proximate the second end of said guide frame and generally following said arcuate slot.

8. The cutting device of claim 4 wherein said slide block is generally "L"-shaped, said pair of guide rails being rigidly secured to a generally vertically oriented portion of said slide block and said lock being rigidly secured to a generally horizontally oriented portion of said slide block.

9. The cutting device of claim 1 wherein said angle indicating indicia on said inset panel face in a direction generally the same as said support surface, said indicia being disposed proximate the second end of said guide frame and generally following said arcuate path.

10. The cutting device of claim 1 wherein said lock comprises a cam member connected to a rod and having a cam surface engaging a portion of said guide frame, said cam member being connected to a sliding lock pin registering in an arcuate slot which defines said arcuate guide surface, whereby rotation of said rod and said cam member in opposite directions locks and unlocks said sliding lock pin with respect to said arcuate slot.

11. The cutting device of claim 10 wherein said sliding lock pin is connected to a head member disposed beneath said arcuate slot and including portions engageable with an underside of said inset panel to lock said second end of said guide frame to said inset panel.

12. The cutting device of claim 11 wherein said cam surface engages an upper surface of said slide block.

13. The cutting device of claim 1 further comprising a retractor device having a flexible line connected between said second end of said guide frame and said support frame for counterbalancing the weight of said guide frame during angular adjustment thereof.

14. An angularly adjustable panel cutting device comprising:

a support frame having a support surface for holding a sheetgood panel of at least approximately 4'×8' in size, said support frame generally being defined by four quadrants;

a guide frame having a first end and a second end, said first end being pivotally secured to said support frame in a lower quadrant of said support frame and said second end including a guide member secured to said guide frame and allowing movement of said second end along an arcuate path contained generally within first and second upper quadrants of said support frame, wherein limits of movement of said guide frame are defined by a vertical orientation thereof defined by said second end being disposed in said first upper quadrant and approximately a 45° orientation relative to said support surface being defined by said second end being disposed in said second upper quadrant;

a retractor device affixed in a stationary manner to said support frame and having a flexible line connected to said second end of said guide frame for counterbalancing the weight of said guide frame during angular adjustment thereof;

a cutting tool carriage mounted for linear movement along said guide frame between said first and second ends; and, a lock connected at said second end of said guide frame and acting between said second end and said support frame to lock said guide frame at a desired angle.

15. The cutting device of claim 14 wherein said support frame is a generally upright frame for holding said panel generally upright during a cutting operation.

16. The cutting device of claim 15 wherein another retractor device is connected to and movable with said frame and includes a flexible line connected to said cutting tool carriage for counterbalancing the weight of said carriage and a cutting tool during a cutting operation.

* * * * *